March 29, 1966  H. C. R. GREEN  3,243,161
APPARATUS FOR ELEVATING RIGID LOADS
Filed Oct. 4, 1963  2 Sheets-Sheet 1
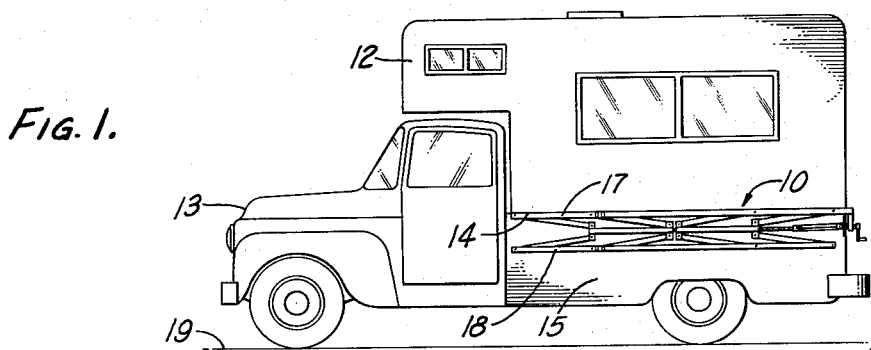
FIG. 1.
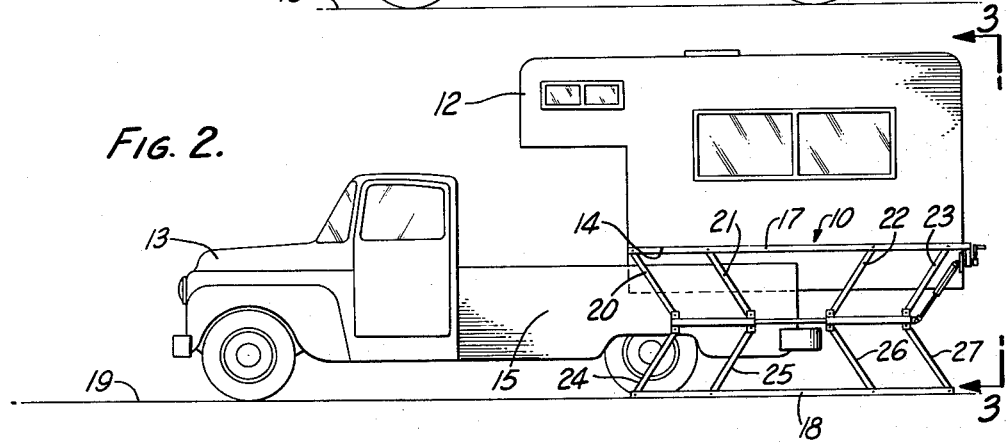
FIG. 2.
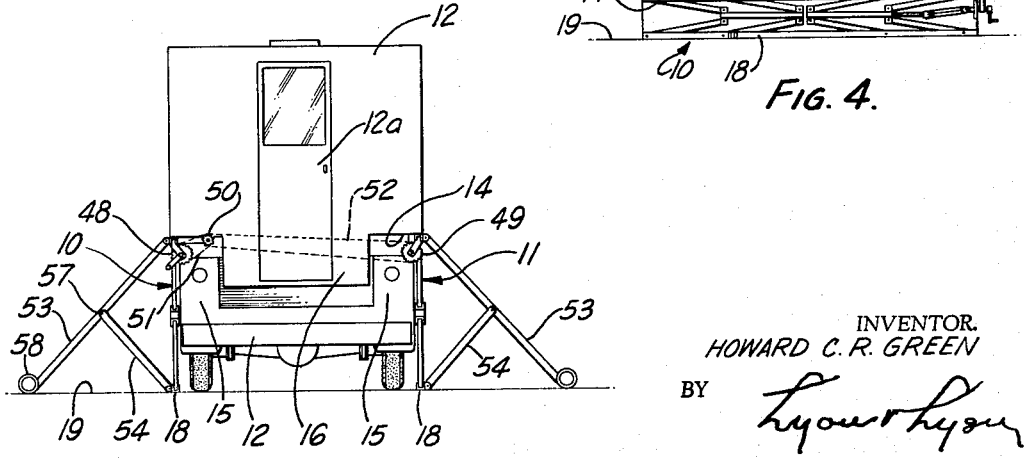
FIG. 3.
FIG. 4.
INVENTOR.
HOWARD C. R. GREEN
BY Lyon & Lyon
ATTORNEYS March 29, 1966     H. C. R. GREEN     3,243,161
APPARATUS FOR ELEVATING RIGID LOADS
Filed Oct. 4, 1963     2 Sheets-Sheet 2
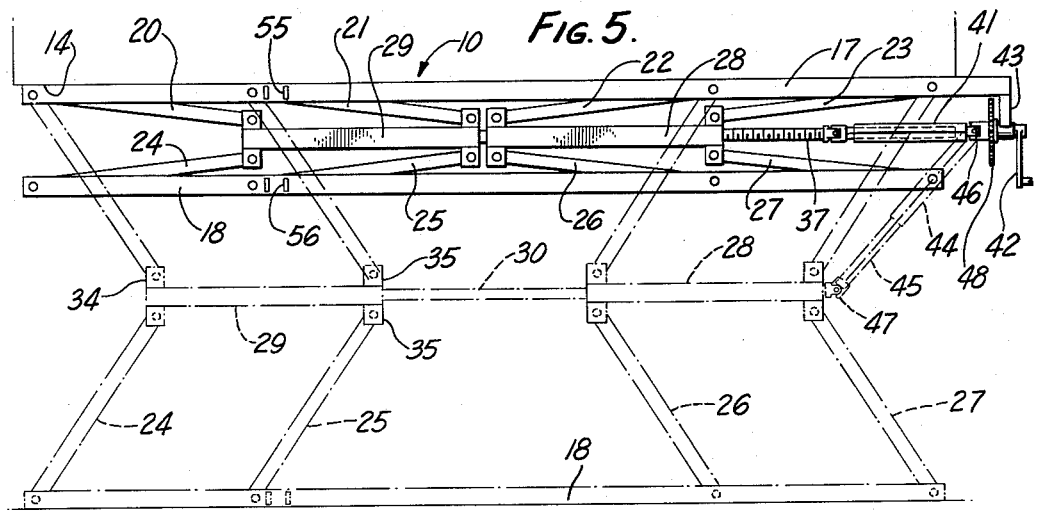
INVENTOR.
HOWARD C. R. GREEN
BY
ATTORNEYS

United States Patent Office 3,243,161
Patented Mar. 29, 1966

---

3,243,161
APPARATUS FOR ELEVATING RIGID LOADS
Howard C. R. Green, 2920 Charnelton St.,
Eugene, Oreg.
Filed Oct. 4, 1963, Ser. No. 314,051
6 Claims. (Cl. 254—45)

This invention relates to a device for uniformly raising and lowering a rigid load a substantial distance regardless of unbalanced weight distribution of such load and, in particular, is directed to such a device that is relatively compact and lightweight for use on rigid loads transported by vehicles.

There are numerous situations wherein an object constituting a heavy rigid load is transported by a vehicle such as a truck and it is desirable to be able to load or unload the object from the truck at various destinations and yet facilities may not be available at such destinations for accomplishing such loading or unloading. One such situation is encountered with the currently popular use by sportsmen, travellers, and the like of living facility units, commonly known as "campers" or "coaches," that are removably mounted on conventional "pickup" trucks. It is often desirable to remove these camper units from the trucks either at the owner's residence or a camp site so that the truck may be used for other transportation purposes. These campers are of such a weight that a number of men would be necessary to manually load or unload the camper and such number of men are usually not available. Moreover, space and weight are at a premioum on these camper units due to the desire to provide the optimum amount of facilities and conveniences in the unit and, therefore, any apparatus for loading and unloading the camper unit must be relatively light and compact. Overhead structures are not always available at particular destinations and, therefore, block and tackle arrangements for lifting the camper unit are not completely adequate.

It is therefore a principal object of this invention to provide a novel apparatus for raising and lowering a rigid load wherein such apparatus may be operated by a single individual and the load is raised or lowered uniformly without regard to any unbalanced weight distribution on the load.

Another object of this invention is to provide an apparatus for elevating rigid loads to be loaded or unloaded from a truck wherein two elevating devices are mounted on the rigid load at spaced locations to permit the truck to be driven between such devices during loading and unloading and such devices have a substantial horizontal length to provide adequate longitudinal stability while raising or lowering the rigid load.

A further object of this invention is to provide a rigid load elevating device having substantial longitudinal length for longitudinal stability and lateral support members that continually engage the ground at all elevations for producing lateral stability.

A still further object of this invention is to provide a mechanical elevating device of lightwenght construction wherein two members are slidably supported on one another for relative longitudinal movement in a horiozntal direction which in turn causes relative vertical movement of two other members to accomplish the elevating function of the device.

A more particular object of this invention is to provide a novel arrangement on a camper unit for elevating the unit from ground level to an adequate height for loading and unloading the unit on a pickup truck wherein an elevating device is provided and secured to each side of the camper unit and extends substantially the length of the base of the camper unit with lateral support means extending outwardly from each elevating device from near the base of the camper unit to adequately support the camper unit in both lateral directions.

Other and more detailed objects and advantages of this invention will appear from the following description and the accompanying drawings.

In the drawings:

FIGURE 1 is an elevation view illustrating a camper unit mounted on a pickup truck with the apparatus of this invention in a retracted position for permitting highway travel.

FIGURE 2 is an elevation view of the camper unit raised by the apparatus of this invention to an elevation above the level of the truck bed for loading or unloading the camper unit on the truck.

FIGURE 3 is an end elevation taken substantially on the line 3—3 of FIGURE 2 and illustrating the lateral support devices that have been omitted from FIGURES 1, 2, 4 and 5 for clarity of illustration of those figures.

FIGURE 4 is a side elevation illustrating the camper unit having been lowered to rest upon the ground.

FIGURE 5 is an elevation view of one of the two elevating devices of this invention and illustrates the retracted position in solid lines and the expanded position in phantom lines.

FIGURE 6 is a fragmentary sectional elevation of the actuating means portion of an elevating device of this invention.

FIGURE 7 is a sectional elevation similar to FIGURE 6 illustrating a modified form of actuating means.

FIGURE 8 is an enlarged end elevation illustrating one of the lateral support devices in two positions with the solid lines indicating the retracted position of the elevating device and the phantom lines indicating the expanded position of the elevating device, respectively, similar to the relationships illustrated in FIGURE 5.

Referring now to the drawings, the apparatus of this invention includes two elevating devices or jack assemblies, generally designated 10 and 11, which when appropriately operated in a manner hereinafter described serve to raise and lower the camper unit 12 for loading or unloading the unit from the pickup truck 13. The camper unit 12 is slightly wider than truck 13 and has a downwardly facing frame portion 14 on each side which extends laterally beyond the side 15 of the truck bed. As is conventional, the camper unit 12 may be provided with a downwardly extending central portion 16 adapted to fit within the truck bed between the sides 15. Although this relationship between the camper unit 12 and truck 13 is somewhat conventional and readily adapts itself for use with the subject invention, it is to be understood and will readily appear to those skilled in the art that the invention is equally adaptable for use with other rigid frame loads and types of trucks or if the camper unit or other rigid load is narrower than the truck appropriate frame extensions obviously could be employed.

The jack assemblies 10 and 11 are substantially identical except for the mechanism for operating both simultaneously which will hereinafter be described, and therefore the construction of only one jack assembly will be specifically described. The jack assembly 10 includes an elongated frame member 17 mounted on the underside frame portion 14 of the camper unit laterally beyond the side 15 of the truck. Frame member 17 extends substantially the entire length of frame portion 14 and in the illustrated embodiment extends a short distance beyond the rear of frame portion 14 appropriately supporting certain of the operating mechanism of the device. The elevating device 10 also includes a second elongated frame member 18 substantially parallel to and spaced below the member 17. Frame member 18 is relatively the same length as frame member 17 and is adapted to engage the ground 19 for supporting the camper unit 12.

Frame members 17 and 18 may be of any convenient construction, such as the channel shaped members illustrated, that are adequate to provide the needed strength and rigidity, but it is to be noted that since member 17 is attached to and supported by the camper unit and member 18 is supported by the ground when under load these members may be of lightweight construction. Four link members 20, 21, 22 and 23 are pivotally mounted at spaced locations on the frame member 17. Link members 20 and 21 mounted near one end of frame member 17 and link members 22 and 23 are mounted near the other end of frame member 17 with the predetermined distance between the pivotal mountings of members 20 and 21 being equal to the distance between the pivotal mountings of members 22 and 23. Similarly, four link members 24, 25, 26 and 27 are pivotally mounted on frame member 18 in the identical relationship as link members 20, 21, 22 and 23, respectively. The eight link members 20 through 27 are of substantially equal length and are of sufficient strength and rigidity to accommodate the compression loads that will be applied in raising and lowering the camper unit 12 as hereinafter described. The pivotal mounting of the link members to the frame members 17 and 18 may be of any convenient type capable of confining the pivotal movement of the link members in a plane passing through the two frame members 17 and 18.

Means are provided for causing relative vertical movement between the frame members 17 and 18 and, as shown in the drawings, these means may include a tubular member 28 and a rod member 29 positioned between the frame members 17 and 18. The rod member 29 has a rigid extension portion 30 slidably telescoping within and mating with the tubular member 28. The extension portion 30 and tubular member 28 may be of any convenient mating cross-section, a square cross-section being shown for illustration purposes. Appropriate brackets 31 are mounted on each longitudinal end of the tubular member 28 for pivotally supporting the four link members 22, 23, 26 and 27. Link members 22 and 26 are pivotally mounted on pins 32 that are in turn mounted on the brackets 31 positioned at that end of tubular member 28 near rod member 29. Link members 23 and 27 are pivotally mounted on pins 33 on bracket 31 positioned at the end of tubular member 28 remote from rod member 29. The center-to-center distance between the pivotal mountings of link members 22 and 23 and between the pivotal mountings of link members 26 and 27 are equal and substantially identical to the heretofore described distance between pivotal mountings of link members 20 and 21 and also link members 22 and 23. Similarly, a bracket 34 is mounted on that end of rod member 29 that is remote from tubular member 28 and a bracket or brackets 35 are mounted on rod member 29 spaced from bracket 34 toward tubular member 28 but with the extension portion 30 of rod member 29 extending beyond brackets 35. Link members 20, 21, 24 and 25 are pivotally mounted on brackets 34 and 35 on the rod member 29 at spaced locations identical to the heretofore described mounting of link members 22, 23, 26 and 27, respectively, on tubular member 28. Link members 20, 21, 24 and 25 are all positioned near one longitudinal end of jack assembly 10 and are continually inclined at an acute angle relative to rod member 29 in a direction extending away from rod member 29 and the center of the jack assembly. Similarly, link members 22, 23, 26 and 27 positioned near the other end of jack assembly 10 extend at acute angles in the opposite direction. Thus, it may be seen that horizontal longitudinal relative movement between tubular member 28 and rod member 29 causes simultaneous pivotal movement of all of the link members 20 through 27 to in turn cause vertical relative movement between frame members 17 and 18. Movement of members 28 and 29 toward or away from each other causes movement of members 17 and 18 toward or away from, respectively, each other. The frame members 17 and 18 remain parallel throughout their movement and are parallel to members 28 and 29 since each pair of link members extending between one of the frame members and either the tubular member 28 or the rod member 29 forms a movable parallelogram thereby continually confining the tubular member and rod member to positions parallel to the frame members.

In order to produce relative longitudinal movement between the tubular member 28 and the rod member 29 to thereby cause relative vertical movement between the frame members, a threaded shaft 36 having a righthanded threaded portion 37 and a lefthanded threaded portion 38 is provided. Threaded portion 37 engages a nut 39 secured to one end of tubular member 28 and threaded portion 38 engages a nut 40 secured to the end of extension portion 30 of the rod member 29. It may readily be seen that rotation of shaft 36 in one direction causes nuts 39 and 40 to be axially separated thereby forcing rod member 29 to move longitudinally away from tubular member 28, whereas rotation of shaft 36 in the opposite direction causes the opposite relative movement between tubular member 28 and rod member 29. It is to be noted that movement in either direction is positively controlled by shaft 36 and by providing a "nonaccelerating" pitched thread or threads 37 and 38 no amount of longitudinal force can cause longitudinal movement between members 28 and 29 without an external force also being applied to shaft 36 to cause rotation thereof.

Conveniently accessible means are provided for rotating shaft 36 to accomplish the desired relative movement between the tubular member 28 and the rod member 29 and, as shown in the drawings, these means may include an extensible shaft 41 and a hand crank 42. Crank 42 is rotatably mounted on a bracket 43 which depends from frame member 17. Extensible shaft 41 may be of any convenient type such as a tube 44 and a telescoping shaft 45 having mating splines or cross-sections. A universal joint 46 connects crank 42 to extensible shaft 41 and another universal joint 47 connects extensible shaft 41 to the threaded shaft 36. Thus, rotation of the hand crank 42 causes like rotation of shaft 36 and extensible shaft 41 accommodates for the change in distance between the crank and shaft 36 as the jack assembly expands and retracts.

In order to accomplish simultaneous and equal movement of both the jack assemblies 10 and 11, means are provided for interconnecting the hand cranks of each. These means may include a sprocket 48 mounted on hand crank 42 of jack assembly 10, a sprocket 49 similarly mounted on assembly 11, and a double idler sprocket 50 rotatably mounted on frame member 17 or an extension thereof. A link chain 51 connects sprocket 48 to one row of teeth of sprocket 50 and a second link chain 52 connects the other row of teeth of sprocket 50 to sprocket 49. Thus, as hand crank 42 is rotated to rotate shaft 36 of assembly 10 a like rotation of shaft 36 of assembly 11 is produced through these sprockets and chains. Chain 52 may be removed after the desired movement of the jack assemblies is accomplished so that access may be had to the door 12a of the camper unit 12.

Referring now more particularly to FIGURES 3 and 8, means may be provided with each of the jack assemblies 10 and 11 for laterally supporting the camper unit 12 during raising or lowering of same, and these means may include a support arm 53 and a connecting arm 54. One end of support arm 53 is pivotally connected to a bracket 55 provided on frame member 17 and one end of support arm 54 is pivotally connected to a bracket 56 provided on frame member 18. Since arms 53 and 54 extend outwardly from the jack assemblies they would constitute substantial obstructions to highway travel and therefore they are either readily removable from brackets 55 and 56, or brackets 55 and 56 may be pivotable about a vertical axis for moving the arms 53 and 54 to a position parallel and adjacent to the heretofore described members of the jack assemblies. Support arm 53 is substantially longer than the maximum height to which frame member 17 may be raised so that at such maximum height support arm 53 extends outwardly at an angle to the ground as shown in FIGURE 3. Connecting arm 54 is substantially half the length of support arm 53 and is pivotally connected at 57 to the midpoint of support arm 53. By this relationship, the free end of support arm 53 continually engages the ground 19 as the jack assemblies are expanded or retracted in supporting the camper unit 12. In the collapsed position of the jack assemblies shown in FIGURE 4, the support arm 53 and connecting arm 54 would be substantially in the position shown by solid lines in FIGURE 8. When the camper unit 12 is elevated by the jack assemblies these arms will assume positions shown by phantom lines in FIGURE 8.

The ground engaging end of support arm 53 is provided with an eccentrically mounted circular member 58 adapted to engage the ground 19. By this arrangement the length of support arm 53 between the pivotal connection at bracket 55 and engagement with the ground is effectively "lengthened" as the height of the frame member 17 increases. This may readily be perceived by considering the difference in location of the contact points 58a and 58b of the circular member 58 for the two positions shown in FIGURE 8. By this relationship it may be seen that an increased load is placed on support arm 53 and therefore a greater lateral support force is produced by the support arm 53 the higher the camper unit is raised and the closer the ground engaging end of the arm comes to the jack assembly.

Referring now more particularly to FIGURE 7, a modified actuating mechanism is illustrated for accomplishing the vertical separation of frame members 17 and 18. A rod member 60 is provided similar to rod member 29 and has an extension portion 61 extending within a tubular member 62 similar to tubular member 28. Extension portion 41 is slidably journalled in a bearing 63 mounted in one end of tubular member 62. A piston 64 is provided on the end of extension portion 61 and has conventional sealing means for sealably engaging the inner surface of tubular member 62. In this arrangement it is preferred that extension portion 61, tubular member 62 and piston 64 be circular in cross-section. The end of tubular member 62 remote from bearing 63 is provided with a plug 65 having a port therethrough with a hydraulic fitting 66 connected to such port. Extension portion 61 is provided with an internal passageway 67 communicating with lateral passageways 68 positioned near piston 64 and also communicating with a hydraulic fitting 69 at the other end of the extension portion 61. Lateral passageways 68 communicate with the annular space between extension portion 61 and the interior of tubular member 62. Hoses 70 and 71 extend from hydraulic fittings 66 and 69, respectively, to a suitable hydraulic pump and reservoir (neither being shown). The link members 20 through 27 are pivotally connected to rod member 60 and tubular member 62 in the same or a substantial similar manner as heretofore described connection to rod member 29 and tubular member 28, respectively. By appropriately operating the hydraulic pump and suitable valving, fluid under pressure can be supplied through hose 70 to cause longitudinal movement of the rod member 60 away from tubular member 62. Conversely by supplying fluid under pressure through hose 71 and bleeding off fluid through hose 70 the extension portion 61 of the rod member can be made to move toward tubular member 62. Thus, the desired relative vertical movement between frame members 17 and 18 may be accomplished by this hydraulic mechanism rather than the heretofore described mechanical mechanism using threaded shaft 36.

Thus, it may be seen that by this invention there has been provided a relatively compact and light-weight apparatus for raising and lowering rigid loads a substantial distance and due to the substantial longitudinal length of the apparatus and the lateral support means, the rigid load is adequately supported regardless of unbalanced loading. The load supporting members of the apparatus may extend longitudinally the full length of the base of rigid load and yet will not extend beyond the such base to constitute an obstruction in any of the positions of the apparatus. The two relatively movable actuating members are of lightweight construction since they are journalled within one another.

Having fully described my invention, it is to be understood that I do not wish to be limited to the details herein set forth or to the details illustrated in the drawings, but my invention is of the full scope of the appended claims.

I claim:

1. A device for elevating and lowering rigid loads relative to the ground, comprising: a pair of jack assemblies for engaging the rigid load at spaced locations, each jack assembly having a pair of substantially parallel and vertically spaced elongated members for engaging the underside of the rigid load and the ground, respectively, a pair longitudinally movable and slidably interengaging members positioned between and substantially parallel to said pair of elongated members of each said assembly, operable means on each jack assembly for causing longitudinal telescoping movement between said pair of interengaging members, means on each jack assembly connecting said interengaging members to said elongated members for causing relative vertical movement between said elongated members upon relative longitudinal movement between said interengaging members and for structurally confining said elongated members and said interengaging members in parallel relation to each other upon such movement for raising and lowering the rigid load, and a lateral supporting means on each said jack assembly including an elongated arm having one end pivotally connected to said upper elongated member for pivotal movement about an axis parallel to the length of said elongated member and the other end adapted to engage the ground, a connecting arm of approximately half the length of said elongated arm pivotally connected to approximately the mid-point of said elongated arm and to said lower elongated member, whereby the said other end of said elongated arm continually engages the ground for lateral support as the said elongated members move toward and away from each other.

2. A device for elevating and lowering rigid loads relative to the ground, comprising: a pair of jack assemblies for engaging the rigid load at spaced locations, each jack assembly having a pair of substantially parallel and vertically spaced elongated members for engaging the underside of the rigid load and the ground, respectively, a pair longitudinally movable and slidably interengaging members positioned between and substantially parallel to said pair of elongated members of each said assembly, operable means on each jack assembly for causing longitudinal telescoping movement between said pair of interengaging members, means on each jack assembly connecting said interengaging members to said elongated members for causing relative vertical movement between said elongated members upon relative longitudinal movement between said interengaging members and for structurally confining said elongated members and said interengaging members in parallel relation to each other upon such movement for raising and lowering the rigid load, a lateral supporting means on each said jack assembly including an elongated arm having one end pivotally connected to said upper elongated member for pivotal movement about an axis parallel to the length of said elongated member and the other end adapted to engage the ground, a connecting arm of approximately half the length of said elongated arm pivotally connected to approximately the mid-point of said elongated arm and to said lower elongated member, whereby the said other end of said elongated arm continually engages the ground for lateral support as the said elongated members move toward and away from each other, and an upwardly curved means on said ground engaging end of said elongated arm for increasing the effective length of said elongated arm and engaging the ground with increasing force as the spacing between said elongated members is increased.

3. A device for elevating and lowering rigid loads relative to the ground, comprising: a pair of jack assemblies for engaging the rigid load at spaced locations, each jack assembly having a pair of substantially parallel and vertically spaced elongated members, the upper of said elongated members of each pair for engaging the underside of the rigid load and the lower of said elongated members for engaging the ground, a tubular member positioned between and substantially parallel to each said pair of elongated members, a rod member positioned between and substantially parallel to each said pair of elongated members, said rod member having a portion slidably telescoping within said tubular member; means for structurally confining said upper and lower elongated members, said tubular member, and said rod member in parallel relation to each other upon movement of said elongated members toward and away from each other including four pair of links of equal length pivotally connected at each end, the first pair of links extending between said tubular member and said upper elongated member, the second pair of links extending between said tubular member and said lower elongated member, the third pair of links extending between said rod member and said upper elongated member, and the fourth pair of links extending between said rod member and said lower elongated member; operable means for causing longitudinal telescoping movement between said rod member and said tubular member for in turn causing movement of said elongated members toward and away from each other for lowering and raising the rigid load, respectively, and a lateral supporting means on each said jack assembly including an elongated arm having one end pivotally connected to said upper elongated member for pivotal movement about an axis parallel to the length of said elongated member and the other end adapted to engage the ground, a connecting arm of approximately half the length of said elongated arm pivotally connected to approximately the mid-point of said elongated arm and to said lower elongated member, whereby the said other end of said elongated arm continually engages the ground for lateral support as the said elongated members move toward and away from each other.

4. A device for elevating and lowering rigid loads relative to the ground, comprising: a pair of jack assemblies for engaging the rigid load at spaced locations, each jack assembly having a pair of substantially parallel and vertically spaced elongated members, the upper of said elongated members of each pair for engaging the underside of the rigid load and the lower of said elongated members for engaging the ground, a tubular member positioned between and substantially parallel to each said pair of elongated members, a rod member positioned between and substantially parallel to each said pair of elongated members, said rod member having a portion slidably telescoping within said tubular member; means for structurally confining said upper and lower elongated members, said tubular member, and said rod member in parallel relation to each other upon movement of said elongated members toward and away from each other including four pair of links of equal length pivotally connected at end, the first pair of links extending between said tubular member and said upper elongated member, the second pair of links extending between said tubular member and said lower elongated member, the third pair of links extending between said rod member and said upper elongated member, and the fourth pair of links extending between said rod member and said lower elongated member; operable means for causing longitudinal telescoping movement between said rod member and said tubular member for in turn causing movement of said elongated members toward and away from each other for lowering and raising the rigid load, respectively, and a lateral supporting means on each said jack assembly including an elongated arm having one end pivotally connected to said upper elongated member for pivotal movement about an axis parallel to the length of said elongated member and the other end adapted to engage the ground, a connecting arm of approximately half the length of said elongated arm pivotally connected to approximately the mid-point of said elongated arm and to said lower elongated member, whereby the said other end of said elongated arm continually engages the ground for lateral support as the said elongated members move toward and away from each other, and an upwardly curved means on said ground engaging end of said elongated arm for increasing the effective length of said elongated arm and engaging the ground with increasing force as the spacing between said elongated members is increased.

5. A device for elevating and lowering rigid loads relative to the ground, comprising: a pair of jack assemblies for engaging the rigid load at spaced locations, each jack assembly having a pair of substantially parallel and vertically spaced elongated members, the upper of said elongated members of each pair attached to the underside of the rigid load and the lower of said elongated members for engaging the ground, a tubular member positioned between and substantially parallel to each said pair of elongated members, a rod member positioned between and substantially parallel to each said pair of elongated members, said rod member having a portion slidably telescoping within said tubular member, a first pair of parallel links of substantially equal length extending between and pivotally connected at each end to said tubular member and said upper elongated member, a second pair of parallel links of substantially equal length extending between and pivotally connected at each end to said tubular member and said lower elongated member, a third pair of parallel links of substantially equal length extending between and pivotally connected at each end to said rod member and said upper elongated member, a fourth pair of parallel links of substantially equal length extending between and pivotally connected at each end to said rod member and said lower elongated member, said links connected to said rod member extending at acute angles relative to said rod member away from said tubular member toward said elongated members, said links connected to said tubular member extending at acute angles relative to said tubular member away from said rod member toward said elongated members, operable means for causing longitudinal telescoping movement between said rod member and said tubular member for in turn causing movement of said elongated members toward and away from each other for lowering and raising the rigid load, respectively; a lateral supporting means on each said jack assembly including an elongated arm having one end pivotally connected to said upper elongated member for pivotal movement about an axis parallel to the length of said elongated member and the other end adapted to engage the ground, a connecting arm of substantially half the length of said elongated arm pivotally connected to substantially the mid-point of said elongated arm and to said lower elongated member, whereby the said other end of said elongated arm continually engages the ground for lateral support as the said elongated members move toward and away from each other, and an upwardly curved means on said other end of said elongated arm for engaging the ground with increasing force as the spacing between said elongated members is increased.

6. A device for elevating and lowering rigid loads relative to the ground, comprising: a pair of jack assemblies for engaging the rigid load at spaced locations, each jack assembly having a pair of substantially parallel and vertically spaced elongated members, the upper of said elongated members of each pair attached to the underside of the rigid load and the lower of said elongated members for engaging the ground, a tubular member positioned between and substantially parallel to each said pair of elongated members, a rod member positioned between and substantially parallel to each said pair of elongated members, said rod member having a portion slidably telescoping within said tubular member, a first pair of parallel links of substantially equal length extending between and pivotally connected at each end to said tubular member and said upper elongated member, a second pair of parallel links of substantially equal length extending between and pivotally connected at each end to said tubular member and said lower elongated member, a third pair of parallel links of substantially equal length extending between and pivotally connected to each end to said rod member and said upper elongated member, a fourth pair of parallel links of substantially equal length extending between and pivotally connected at each end to said rod member and said lower elongated members, said links connected to said rod member extending at acute angles relative to said rod member away from said tubular member toward said elongated members, said links connected to said tubular member extending at acute angles relative to said tubular member away from said rod member toward said elongated members, operable means for causing longitudinal telescoping movement between said rod member and said tubular member for in turn causing movement of said elongated members toward and away from each other for lowering and raising the rigid load, respectively; a lateral supporting means on each said jack assembly including an elongated arm having one end pivotally connected to said upper elongated member for pivotal movement about an axis parallel to the length of said elongated member and the other end adapted to engage the ground, a connecting arm of substantially half the length of said elongated arm pivotally connected to substantially the midpoint of said elongated arm and to said lower elongated member, whereby the said other end of said elongated arm continually engages the ground for lateral support as the said elongated members move toward and away from each other, an upwardly curved means on said other end of said elongated arm for engaging the ground with increasing force as the spacing between said elongated members is increased; and means interconnecting the said operable means of both said jack assemblies for causing simultaneous and equivalent movement of both jack assemblies.

References Cited by the Examiner

UNITED STATES PATENTS

| | | | |
|---|---|---|---|
| 2,507,769 | 5/1950 | Churchill | 254—122 |
| 2,581,706 | 1/1952 | Rimbach | 254—126 |
| 2,621,021 | 12/1952 | Dahl et al. | |

WILLIAM FELDMAN, *Primary Examiner.*

MILTON S. MEHR, *Examiner.*

O. M. SIMPSON, *Assistant Examiner.*